United States Patent [19]

Miyasaka

[11] Patent Number: 5,058,092

[45] Date of Patent: Oct. 15, 1991

[54] METHOD FOR ACCESSING A CONTROL TRACK BY POSITIONING AN OPTICAL HEAD AT THE CENTER OF THE CONTROL TRACK

[75] Inventor: Toshiyuki Miyasaka, Yokohama, Japan

[73] Assignee: Kabushiki Kaisha Toshiba, Kawasaki, Japan

[21] Appl. No.: 584,509

[22] Filed: Sep. 17, 1990

Related U.S. Application Data

[63] Continuation of Ser. No. 242,383, Sep. 8, 1988, abandoned.

[30] Foreign Application Priority Data

Sep. 9, 1987 [JP] Japan ................... 62-225527

[51] Int. Cl.⁵ ............................................. G11B 7/00
[52] U.S. Cl. .......................... 369/44.27; 369/58
[58] Field of Search .................. 369/50, 53–58, 369/43, 44.11, 44.26, 32, 47, 48, 44.27; 358/342; 360/25, 31

[56] References Cited

U.S. PATENT DOCUMENTS 4,106,058  8/1978  Romeas et al. ............... 369/121 X
4,498,146  2/1985  Martinez ...................... 360/31 X
4,769,802  9/1988  Tatsuguchi ..................... 369/46
4,835,757  5/1989  Abiko ......................... 369/58 X

FOREIGN PATENT DOCUMENTS 0164061  12/1985  European Pat. Off. .
6048055  10/1985  Japan .

OTHER PUBLICATIONS

ISO 5" Write Once Optical Disk Standard, ISO/TC97 SC23N/79, 1987.
West German Patent Office Action, dated Apr. 13, 1989, and an English Translation.
Videodisc Systems Theory & Applications, Prentice-Hall, Inc., Mar. 23, 1987, Jordan Isailovic, pp. 210–213.

Primary Examiner—Robert L. Richardson
Attorney, Agent, or Firm—Finnegan, Henderson, Farabow, Garrett and Dunner

[57] ABSTRACT

An optical head is first positioned at an initial position and is then moved along a radius of an optical disk. The optical head is moved by a predetermined distance corresponding to a distance from the initial position to a center of width of the control track. The optical head is stopped accurately at the center of the control track.

14 Claims, 7 Drawing Sheets

ENLARGED VIEW

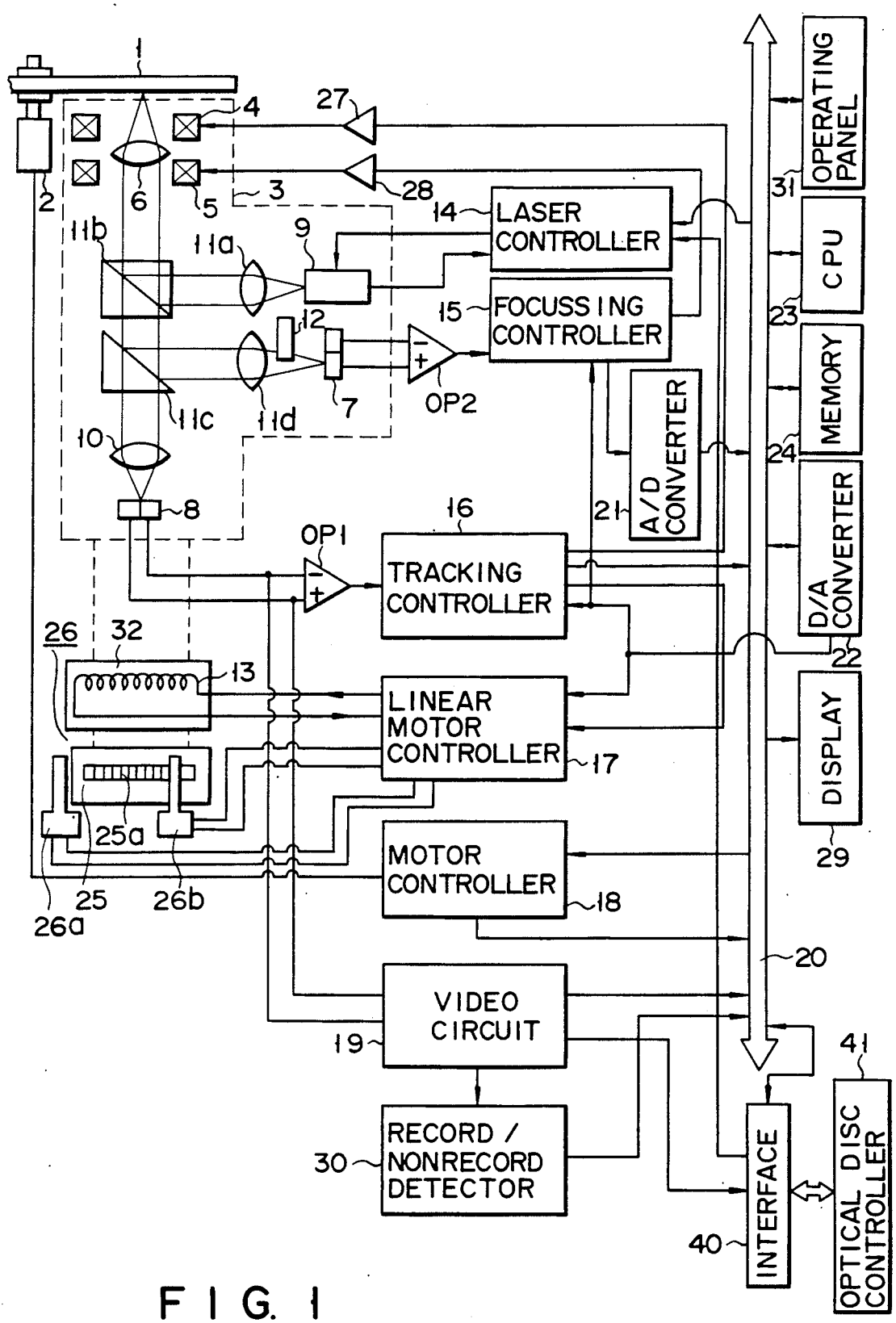
F I G. 1

ENLARGED VIEW

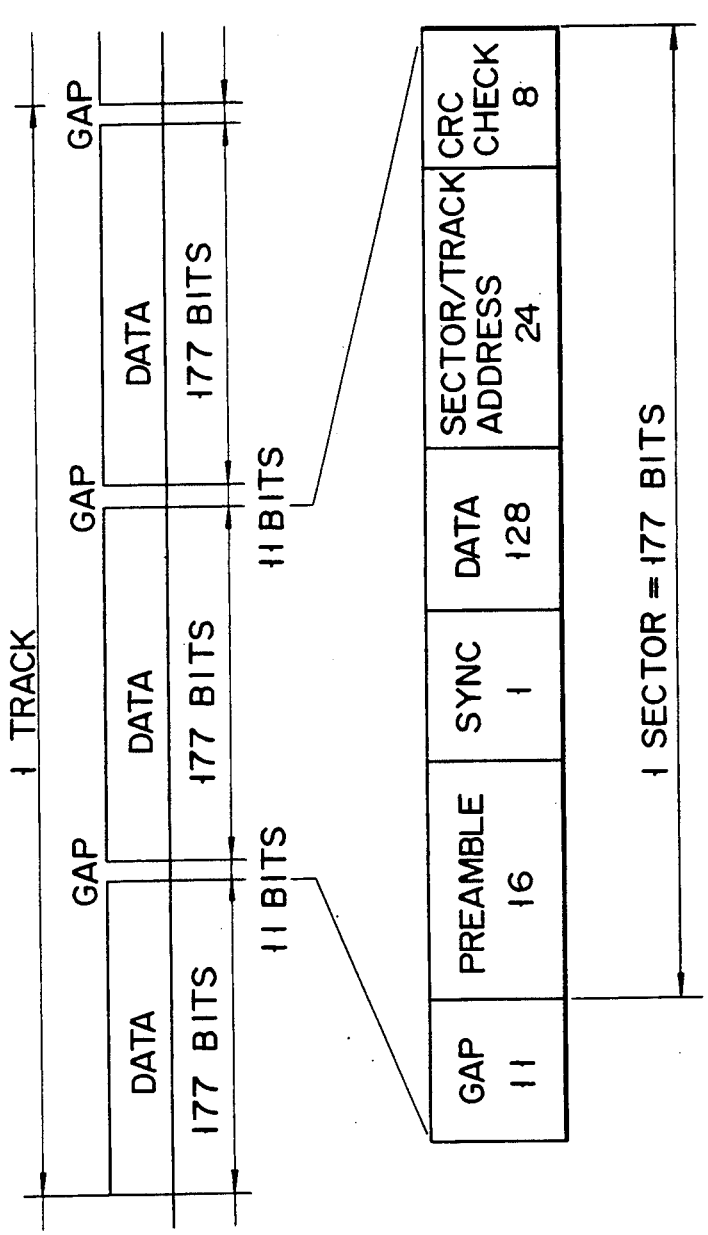
F I G. 4
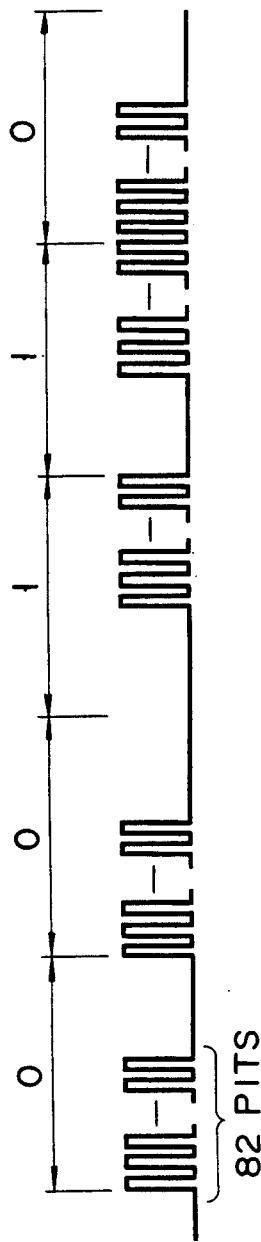
F I G. 5

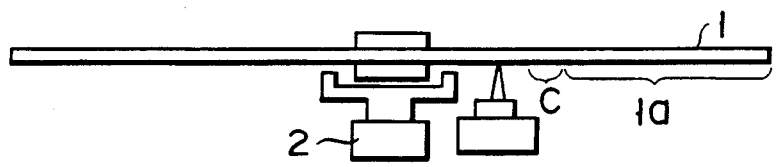
FIG. 9
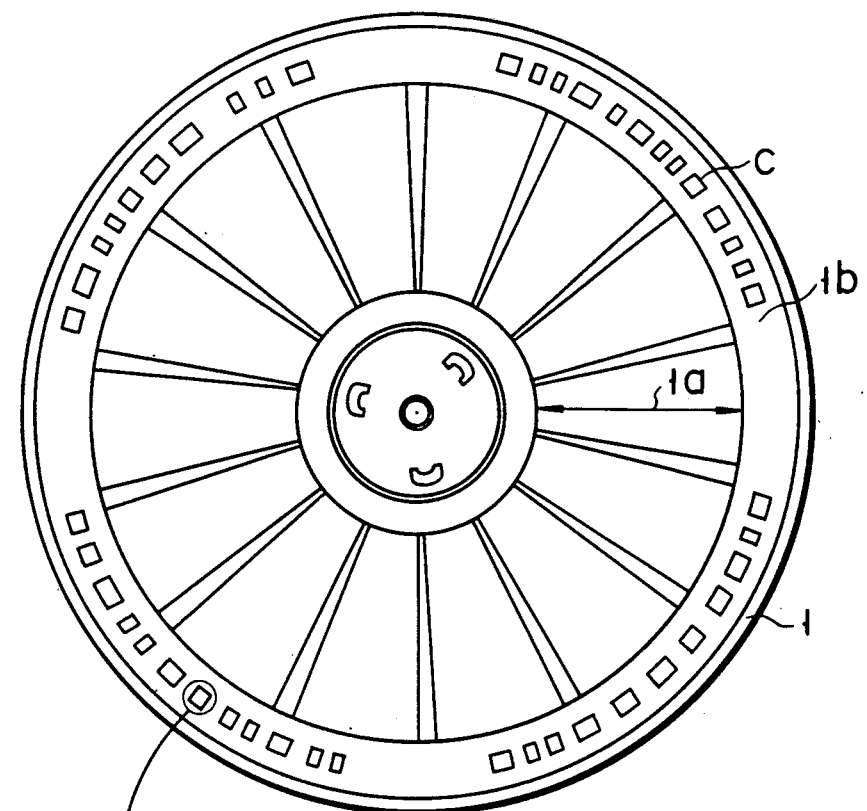
ENLARGED VIEW
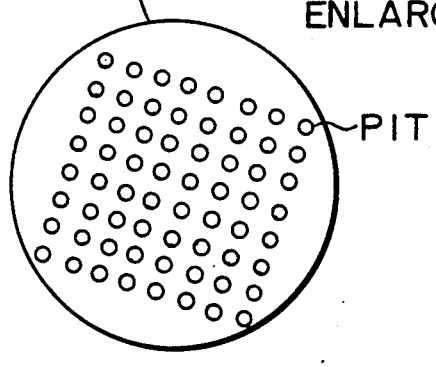
FIG. 10

METHOD FOR ACCESSING A CONTROL TRACK BY POSITIONING AN OPTICAL HEAD AT THE CENTER OF THE CONTROL TRACK

This application is a continuation of application Ser. No. 07/242,383, filed Sept. 8, 1988, now abandoned.

BACKGROUND OF THE INVENTION

1. Field of the Invention

The present invention relates to a data recording/reproducing apparatus, and, more particularly, to an apparatus for accessing a control track on an optical disk and a method for the same.

2. Description of the Related Art

Data recording/reproducing apparatuses use different recording mediums depending on the types of data they deal with. For instance, optical data recording/reproducing apparatuses generally use an optical disk. An optical disk has a plurality of tracks formed on its surface in spiral. Each track has a groove for performing tracking-servo control. Information is recorded by irradiating a laser beam on a record film. There are further a number of sectors set on the surface of the optical disk in its radial direction, each sector given its own address.

The types and characteristics of such optical disks, such as surface reflection factors or optical disks, laser power required for data readout or data writing and the number of sectors around the disk, vary depending on the makers, so that there is conventionally no disk compatibility between them. Under this environment, ISO has set the standard regulations for optical disks, which are intended for the following. A control track, common to the individual makers, is provided inside a recording area of a disk where record data is to be recorded, and data about the characteristic and type of the disk is recorded on this track, whereby any user can effect control of the disk according to that data. Although writing of the types and characteristics of disks on the control track are considered, however, no consideration has been given as to how to access the written data for data readout.

With the prior art technique, therefore, the data written on the control track cannot be actually read out to show the type and characteristic of the disk, nor can disk control according to the data be carried out.

SUMMARY OF THE INVENTION

Accordingly, it is an object of this invention to provide an apparatus which ensures access to, and readout of, characteristic data of an optical disk that is recorded on a control track of the disk.

It is another object to provide a method of ensuring access to, and readout of, characteristic data of an optical disk that is recorded on a control track of the disk.

To achieve the first object, there is provided an optical apparatus for reproducing data by focusing a light beam onto an optical disk, the optical disk having a first area, a second area having a characteristic data of the disk and a third area having data to be reproduced, each area located on the disk along the radial direction from the inner portion of the disk to the outer portion of the disk the optical apparatus comprising, means for directing the light beam onto the optical disk, the directing means facing the first area at an initial condition, and means for directly moving the directing means in the radial direction of the disk according to a predetermined distance between the first area and the second area such that the directing means faces the second area To achieve the second object, there is provided a method of reproducing data by focusing a light beam onto an optical disk, the optical disk having a first area, a second area having a characteristic data of the disk and a third area having data to be reproduced, each area located on the disk along the radial direction from the inner portion of the disk to the outer portion of the disk, the method comprising the steps of directing the light beam onto the optical disk by an optical unit, the optical unit facing the first area at an initial condition, and moving the optical unit in the radial direction of the disk according to a predetermined distance between the first area and the second area such that the optical unit faces the second area.

BRIEF DESCRIPTION OF THE DRAWINGS

The foregoing aspects and other features of the invention will be explained in the following description taken in conjunction with the accompanying drawings wherein:

FIG. 1 is a block diagram of an optical data recording/reproducing apparatus comprising a control track access apparatus embodying this invention;

FIG. 4 is a diagram of the data structure of a control track;

FIG. 5 is a diagram illustrating the pit structure of one bit of the control track;

FIG. 9 shows an optical pickup positioned at the innermost section of the optical disk; and FIG. 10 is a diagram illustrating the structure of the optical disk having a control track provided at its outer circumference.

DETAILED DESCRIPTION OF THE PREFERRED EMBODIMENT

An embodiment of this invention will be described below with reference to the accompanying drawings.

Figure 2:
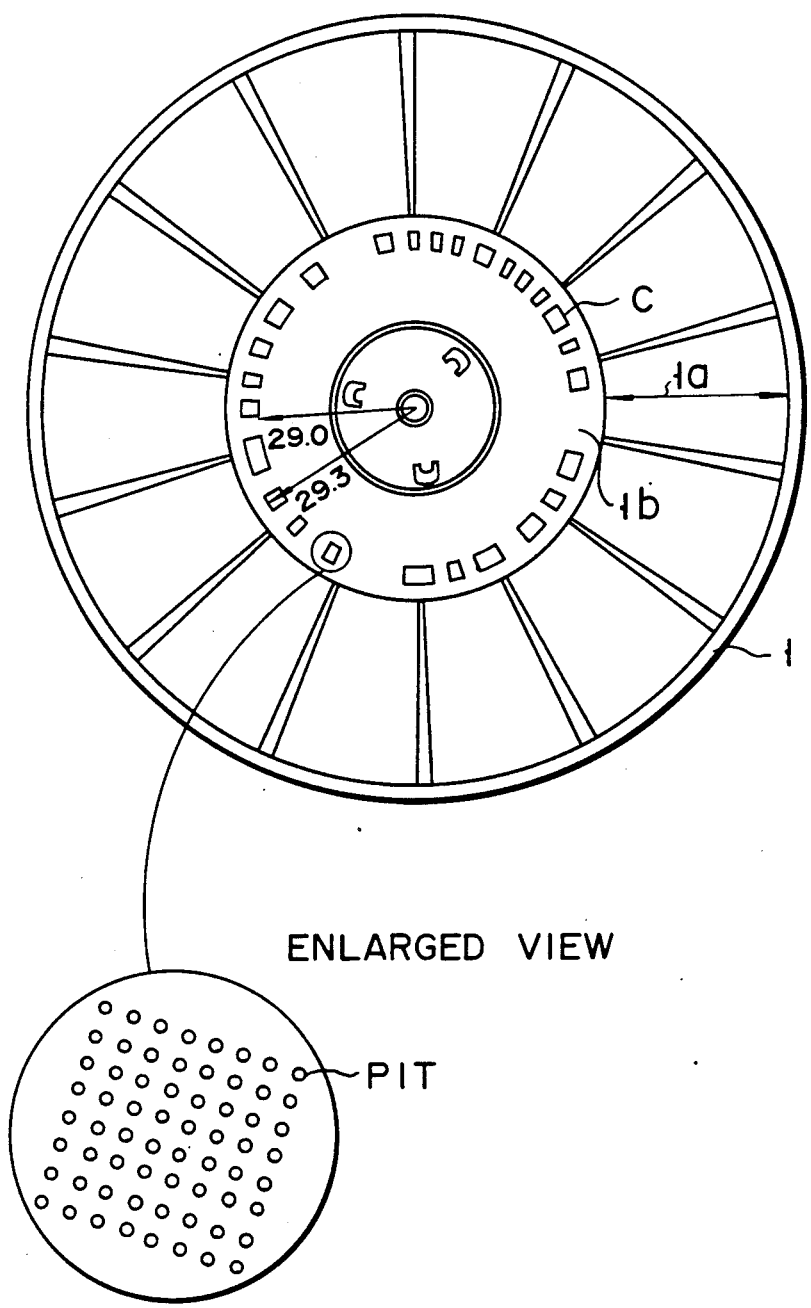
FIG. 2 is a diagram illustrating the structure of an optical disk having a control track provided at its inner circumference.

FIG. 2 illustrates the structure of an optical disk 1 having a control track C formed at its inner circumference.

Optical disk 1 comprises a glass or plastic, disk-shaped substrate and an optical data recording metal coating layer, which is coated on the substrate and is composed of tellurium or bismuth. A data recording area 1a of optical disk 1 has 256 sectors in its radial direction, which are given sector addresses from 0 to 255. The data recording area 1a further has a plurality of tracks provided in spiral, each track having recording holes, called pits, carrying optical data. The distance between pits is associated with data to be recorded. The number of the tracks that data recording area 1a can hold is 36,000. Each track is divided into blocks amounting to 300,000. Each block has a block header provided at its head portion, which includes data such as the block number and track number. This block header may be provided at the time of manufacturing each optical disk.

Optical disk 1 further has a characteristic data recording area 1b provided inward of data recording area 1a and provided with a control track C. This control track C may be provided at the time of manufacturing the optical disk. Data about the characteristic and type of the optical disk are recorded in bar code on control track C at three sections therearound in the circumferential direction thereof. These three sections hold the same characteristic data which includes data about the characteristic of optical disk 1, such as the reflection factor of the coating layer, data about the power of a semiconductor laser required for irradiating a laser beam on the coating layer at the time of data recording-/reproducing, and data about the format, such as the number of sectors on, and around, the surface of the optical disk in the circumferential direction.

As shown in FIG. 2, control track C has a predetermined recording width in the radial direction of optical disk 1, the width defined by the distance (radial position) from the center of optical disk 1. For instance, control track C in FIG. 2 is recorded on a region lying between the distances of 29.0 mm and 29.3 mm from the center of track C; therefore, the recording width is 0.3 mm.

Figure 7:
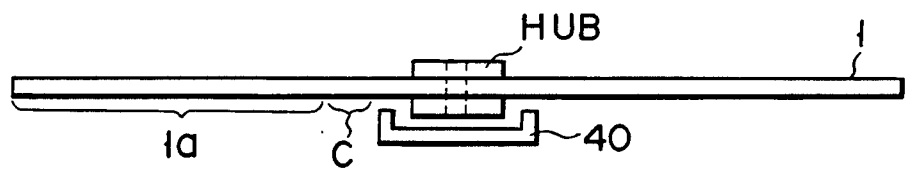
FIG. 7 is a diagram illustrating the positional relationship between the control track C and a turn table at the time an optical disk is set.

As shown in FIG. 7, control track C is provided in such a place that, with optical disk 1 being set in a disk drive (not shown), optical pickup 3 can read data from the control track C without any interference from a turn table 40.

As shown in FIG. 4, the control track C consists of three sectors each including a gap, preamble data, a sync signal, data about the disk characteristic, etc., sector/track address data and CRC check data. The number of bits for these data is 177 bits in total: 11 for the gap, 16 for the preamble, 1 for the sync signal, 128 for the disk characteristic, 24 for the sector/track address and 8 for the CRC check.

As shown in FIG. 5, the presence or absence of consecutive 82 pits along the circumference of optical disk 1 determines whether one bit of each data on control track C is "0" or "1". More specifically, if the consecutive 82 pits exist along the circumference of disk 1 at the first half thereof, and if no sequence of 82 pits exist at the second half, it is determined to be bit "0". On the other hand, if no consecutive 82 pits exist at the first half of the disk 1, and if consecutive 82 pits exist at the second half, it is then determined to be bit "1".

A description will now be given of the optical data recording/reproducing apparatus shown in FIG. 1. Optical disk 1 is rotatable by a DC motor 2 which is controlled by a motor controller 18. Data reproduction from optical disk 1 is carried out through an optical pickup 3. Optical pickup 3 is secured to a drive coil 13 that constitutes the movable section of a linear motor 32. This drive coil 13 is further coupled to a linear motor controller 17. The fixed section of linear motor 32 includes a permanent magnet (not shown). Linear motor 32 is excited by linear motor controller 17 so that optical pickup 3 can move in the radial direction of optical disk 3.

Linear motor controller 17 is coupled to a linear motor position detector 26, which is also coupled to optical pickup 3 and detects an optical scale 25 with slits 25a that is in motion so as to output a signal associated with the position of pickup 3.

Figure 8:
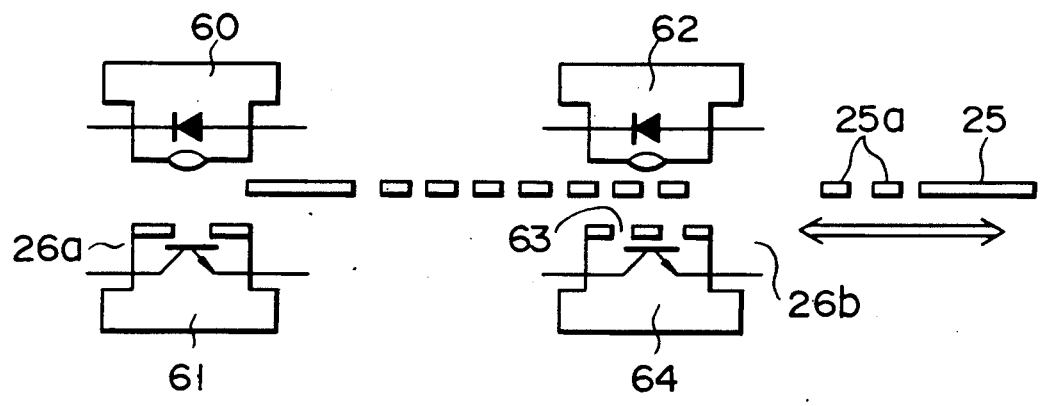
FIG. 8 is a diagram illustrating the structure of each of a pair of sensors and the positional relationship between the sensors and an optical scale.

Linear motor position detector 26, which is secured to the base of an optical disk drive (not shown), comprises a sensor 26a for detecting that linear motor 32 is at the initial position, or the innermost section, of optical disk 1 and a sensor 26b for detecting the amount of displacement of linear motor 32. As shown in FIG. 8, sensor 26a may be constituted by a photosensor which comprise a light emitting element (LED) 60 and a light receiving element (phototransistor) 61, and sensor 26b may be constituted by a photosensor which comprise a light emitting element (LED) 62 and a light receiving element (phototransistor) 64 having slits 63. The combination of slits 25a of optical scale 25 and slits 63 provided at part of receiving element 64 of sensor 26b constitutes a grid type linear encoder. Sensor 26b utilizes a change in amount of light entering light receiving element 64 from light emitting element 62 with movement of optical scale 25 to detect the amount of displacement of the scale 25.

Sensor 26a is mounted at a location which corresponds to a position on optical disk 1 at radius of, for example, 28.0 mm from the center of the disk. Therefore, there is a difference of 1.15 mm between the position of sensor 26a and the center of the recording section of control track C. Since the width of slits 25a and the interval between the slits are 100 μm, the laser beam from optical pickup 3 can be led to the vicinity of the center of the recording section of control track C by moving linear motor 32 by 11.5 scales from the innermost section of optical disk 1.

Optical pickup 3 comprises drive coils 4 and 5, objective lens 6, and semiconductor laser 9. Objective lens 6 is supported by a leaf spring (not shown) in optical pickup 3. This objective lens 6, when driven by drive coil 5, is movable in the focusing direction (the optical axis of the lens), and it is movable in the tracking direction (perpendicular to the optical axis of the lens) when driven by drive coil 4. Semiconductor laser 9 is driven by a laser controller 14 located outside optical pickup 3.

Optical pickup 3 further comprises two pairs of photosensors 7 and 8, focusing lens 10, collimator lens 11a, beam splitter 11b, half-prism 11c, focusing lens 11d, and knife edge 12. The laser beam emitted by semiconductor laser 9 is applied to the surface of disk 1 through collimator lens 11a, beam splitter 11b, and objective lens 6. Reflection light from the disk's surface is led through objective lens 6 and beam splitter 11b to half prism 11c which in turn breaks up the reflection light into two components. One of the components is led to photosensors 8 through focusing lens 10, while the other one is led to photosensors 7 through focusing lens 11d and knife edge 12. The two output signals of photosensors 8 are supplied to an operational amplifier OP1 which sends its corresponding output signal, as a track-error signal, to a tracking controller 16. The track-error signal is generated by subtracting one signal of the two signals from the other. This tracking controller 16 sends the track-error signal, as a tracking control signal, to drive coil 4 through an amplifier 27, thereby allowing objective lens 6 to move. The tracking control signal is also supplied to linear motor controller 17.

Photosensors 7 output two electrical signals associated with the focusing position of a laser beam, and these signals are supplied, as a focus-error signal, to a focusing controller 15 through an operational amplifier OP2. The focus-error signal is generated by subtracting one signal of the two signals from the other. This focusing controller 15 applies a voltage whose level corresponds to the received focus-error signal, to focusing drive coil 5 through an amplifier 28. Consequently, the laser beam is focused on a predetermined position on optical disk 1.

Two electrical signals generated at photosensors 8 are supplied as reproduction signals to a video circuit 19. This video circuit 19 reproduces image data and address data, which are displayable on a display 29.

Laser controller 14, focusing controller 15, tracking controller 16, linear motor controller 17, motor controller 18 and video circuit 19 are controlled by a CPU 23 which is coupled to them through a bus line 20. This CPU 23 runs a predetermined program stored in a memory 24, for example, in accordance with a command entered through an operating panel 31. An A/D converter 21 is used to permit data transmission between focusing controller 15 and CPU 23. A D/A converter 22 is used to permit data transmission between tracking controller 16 and linear motor controller 17 and CPU 23.

A video signal reproduced by video circuit 19 is sent through an interface circuit 40 to an optical disk controller 41 serving as an external unit.

Figure 6:
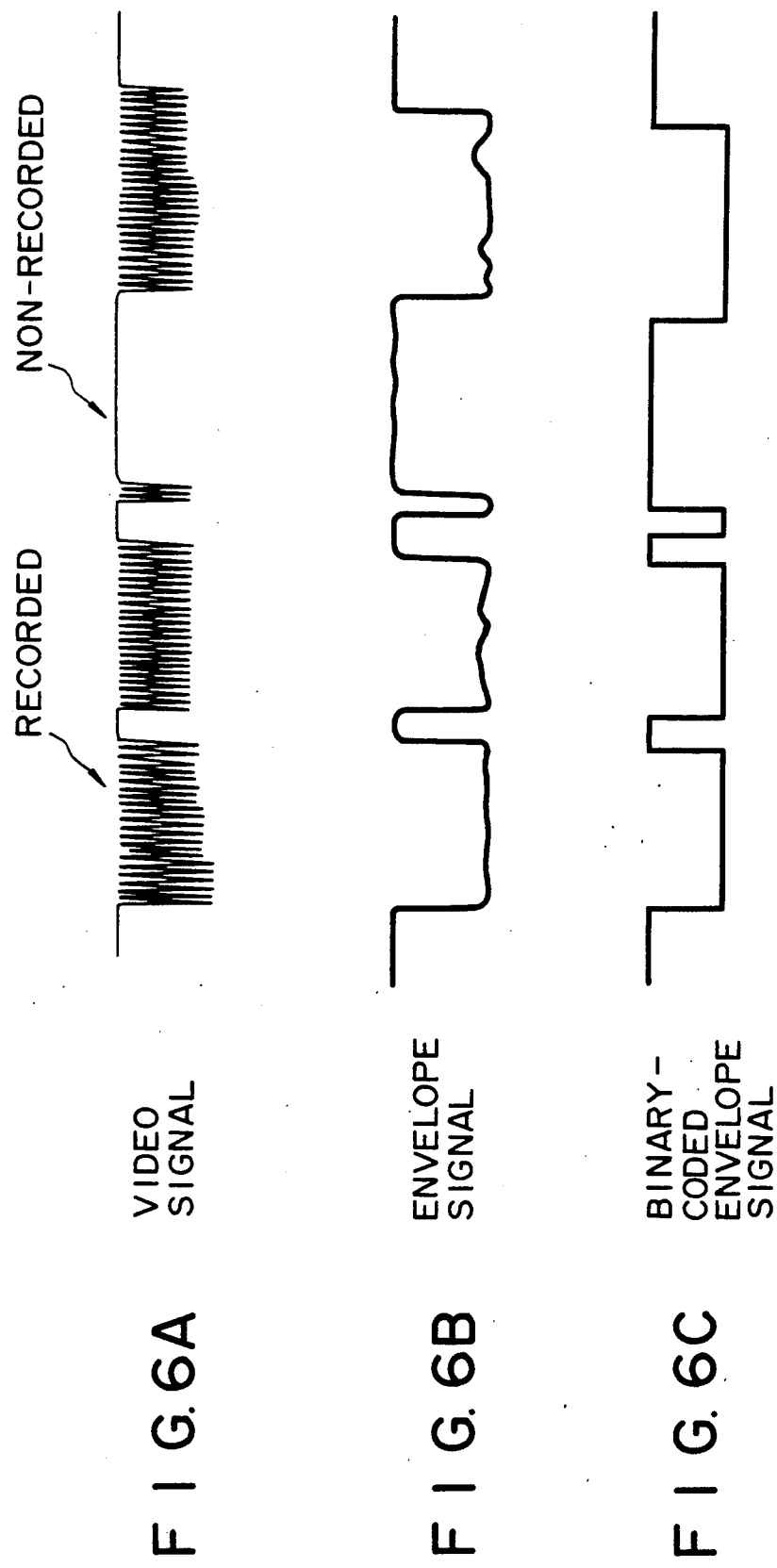
FIG. 6 consisting of 6A–6C, is a diagram illustrating the process for acquiring an envelope binary signal for use in detecting the recording/nonrecording of characteristic data.

The video signal from video circuit 19, which has a waveform shown in FIG. 6A, is also supplied to a record/nonrecord detector 30, which comprises an envelope detector and an envelope binary circuit (neither shown). The envelope detector detects the envelope of the video signal from video circuit 19 (see FIG. 6B), and the determination of whether data has already been recorded on control track C or is not recorded yet is based on this envelope binary signal. Specifically, when the envelope binary signal after the detection of address data is at a low level, it is detected that the data is recorded, and when the signal is at a high level, it is detected that no data is recorded. Upon detection of data being recorded, record/nonrecord detector 30 outputs a recording detection signal to CPU 23.

Figure 3:
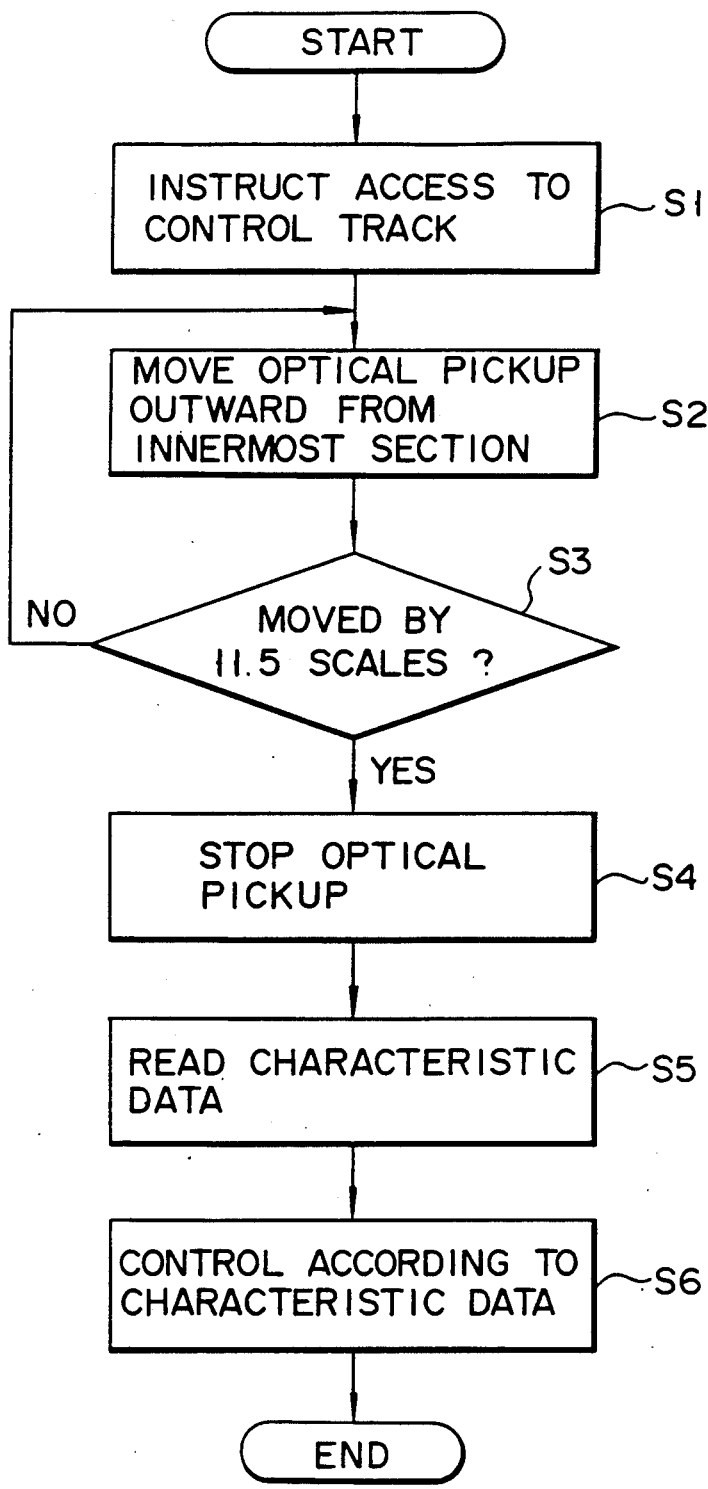
FIG. 3 is a flowchart illustrating the sequence of the access operation to a control track using an optical pickup.

Referring now to the flowchart of FIG. 3, a description will be given of the access operation of optical pickup 3 to control track C provided at the inner circumference of the optical disk 1.

As shown in FIG. 9, assume that optical pickup 3 is initially positioned at the innermost section of optical disk 1 (i.e., inward of the control track area). Suppose that a command to access to control track C is supplied from optical disk controller 41 to CPU 23 through interface circuit 40 (Step 1). Then, CPU 23 controls linear motor controller 17 to move optical pickup 3 from the innermost section of optical disk 1 toward control track C (Step 2).

CPU 23 stops optical pickup 3 (Step 4) when it confirms that linear motor 32 has moved by 11.5 scales (Step 3). This position, as mentioned earlier, corresponds to the vicinity of the center of the recording section of control track C. Thereafter, CPU 23 executes the reading of the characteristic data recorded on control track C (Step 5), along the circumference of optical disk 1 while determining whether the bit of the read data is "0" or "1" by detecting the time interval between the high level and low level of the envelope binary signal from record/nonrecord detector 30. For instance, if the low level state of the binary signal continues for a predetermined time and then the high level state continues for a predetermined time, the bit is determined to be "0". On the other hand, if the binary signal maintains its low level state for a predetermined time after being at the high level for a predetermined time, the bit is determined to be "1". In this way, the optical disk 1 can be controlled according to the characteristic data (Step 6). In the above manner, the characteristic data is read out so that the type and characteristic of optical disk 1 can be known, thus ensuring the proper control for the disk. In other words, the proper disk controls can be provided for optical disks of different types and different characteristics.

Since optical pickup 3 has accesses to the radial directional center of control track C having a 0.3 mm width, it can be moved within an allowable displacement error of optical scale 25.

In brief, in accessing control track C, optical pickup 3 is moved from the innermost section of optical disk 1 toward control track C by 11.5 scales to be in the vicinity of the center of control track C. At this time, optical pickup 3 is stopped and reading the characteristic data is started. Thereafter, data reading is executed while determining whether the bit of the characteristic data is "1" or "0" by detecting the duration between the high level and low level of the envelope binary signal supplied from record/nonrecord detector 30.

Therefore, as access to control track C is permitted, the characteristic data recorded on control track C can be read out so as to provide the proper control for different optical disks according to their specifications.

Although the above description has been given with reference to the access operation of optical pickup 3 to control track C provided at the inner circumference of optical disk 1, starting from the innermost section of an optical disk, this invention is not limited to this particular case. The access operation may start from the outermost section of the optical disk or from any point on the disk. Also, as shown in FIG. 10, control track C can be provided at the outer circumference of optical disk 1.

What is claimed is:

1. An apparatus for accessing a control track having a predetermined width on an optical disk, said control track having characteristic data relating to physical and operative characteristics of said optical disk, comprising:

optical pickup means for directing a light beam onto said optical disk and for receiving a light beam reflected from said optical disk;
means for positioning said optical pickup means at an initial position;
means for moving said optical pickup means along a radius of said optical disk from said initial position;
means for detecting a predetermined distance along the radius of said optical disk from said initial position to a center of the predetermined width of said control track; and
means for stopping said optical pickup means when said optical pickup means has been moved said predetermined distance to the center of the predetermined width of said control track as detected by said detecting means.

2. The apparatus according to claim 1, wherein said characteristic data includes data relating to at least a type and format of said optical disk.

3. The apparatus according to claim 1, wherein said control track includes a plurality of pits formed in said optical disk in accordance with International Standardization Organization (ISO) regulations.

4. The apparatus according to claim 1, wherein said optical pickup means includes photosensor means for generating an electrical signal corresponding to said reflected light beam.

5. The apparatus according to claim 1, wherein said control track includes first and second sectors formed within said control track, said first and second sectors having substantially identical characteristic data.

6. The apparatus according to claim 1, wherein said initial position of said optical pickup means is an innermost portion of the optical disk.

7. The apparatus according to claim 1, wherein said initial position of said optical pickup means is an outermost portion of the optical disk.

8. The apparatus according to claim 1, wherein said moving means includes a linear motor coupled to said optical pickup means and wherein said detecting means includes an optical scale coupled to said linear motor for detecting a position of said linear motor.

9. A method for accessing a control track of an optical disk having a predetermined width, said control track having characteristic data relating to physical and operative characteristics of said optical disk, comprising the steps of:

directing a light beam generated by an optical pickup onto the optical disk such that a portion of said light beam is reflected from the optical disk:

receiving said reflected portion of said light beam;

positioning said optical pickup at an initial position;

moving said optical pickup along a radius of the optical disk from said initial position;

detecting a distance moved along the radius of the optical disk by said optical pickup from said initial position; and stopping said optical pickup when the distance moved by said optical pickup equals a predetermined value corresponding to a predetermined distance from said initial position to a center of the width of said control track.

10. The method according to claim 9, wherein said control data includes data relating to at least a type and format of said optical disk.

11. The method according to claim 9, wherein said control data includes a plurality of pits formed in said optical disk in accordance with International Standardization Organization (ISO) regulations.

12. The method according to claim 9, wherein said control track includes first and second sectors formed within said control track, said first and second sectors including substantially identical characteristic data.

13. The method according to claim 9, wherein said initial position of said optical pickup is an innermost portion of the optical disk.

14. The method according to claim 9, wherein said initial position of said optical pickup is an outermost portion of the optical disk.

* * * * *

UNITED STATES PATENT AND TRADEMARK OFFICE
CERTIFICATE OF CORRECTION

PATENT NO. : 5,058,092
DATED : October 15, 1991
INVENTOR(S) : Toshiyuki MIYASAKA It is certified that error appears in the above-identified patent and that said Letters Patent is hereby corrected as shown below:

On the title page, Item [54], after "METHOD" insert --AND APPARATUS--.

Signed and Sealed this

Eleventh Day of May, 1993

*Attest:*

MICHAEL K. KIRK

*Attesting Officer*  Acting Commissioner of Patents and Trademarks